United States Patent
Kawase

(10) Patent No.: US 12,022,834 B2
(45) Date of Patent: Jul. 2, 2024

(54) PHOSPHINE FOR FUMIGATION, METHOD FOR PRODUCING SAME, AND FUMIGATION METHOD

(71) Applicant: Nippon Chemical Industrial Co., Ltd., Tokyo (JP)

(72) Inventor: Hiroya Kawase, Tamura-gun (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 339 days.

(21) Appl. No.: 17/294,460

(22) PCT Filed: Dec. 20, 2019

(86) PCT No.: PCT/JP2019/050165
§ 371 (c)(1),
(2) Date: May 17, 2021

(87) PCT Pub. No.: WO2020/137905
PCT Pub. Date: Jul. 2, 2020

(65) Prior Publication Data
US 2022/0015369 A1    Jan. 20, 2022

(30) Foreign Application Priority Data
Dec. 27, 2018   (JP) ................. 2018-245736

(51) Int. Cl.
*A01N 59/26* (2006.01)
*A01P 15/00* (2006.01)

(52) U.S. Cl.
CPC .............. *A01N 59/26* (2013.01); *A01P 15/00* (2021.08)

(58) Field of Classification Search
CPC .................................................... A01N 59/26
See application file for complete search history.

(56) References Cited

U.S. PATENT DOCUMENTS

| 4,136,155 A | 1/1979 | Hestermann et al. |
| 5,820,840 A | 10/1998 | Horn Feja et al. |
| 2005/0120877 A1* | 6/2005 | Wu .......... C01C 1/024 95/117 |
| 2017/0332617 A1 | 11/2017 | Fouillet |

FOREIGN PATENT DOCUMENTS

| GB | 1 570 868 A | 7/1980 |
| JP | 58-49608 A | 3/1983 |
| JP | 62-138313 A | 6/1987 |
| JP | 1-164711 A | 6/1989 |
| JP | 9-165209 A | 6/1997 |
| JP | 2015-136368 A | 7/2015 |
| JP | 2017-536115 A | 12/2017 |

OTHER PUBLICATIONS

International Search Report dated Mar. 10, 2020, issued in counterpart International Application No. PCT/JP2019/050165 (3 pages).
Chemical Society of Japan (Ed.), New experimental chemistry courses Basic operations II, 1975, pp. 814-815; Cited in JP Office Action dated Aug. 8, 2023. (Refer JP OA dated Aug. 8, 2023 for a concise explanation of relevance).
Office Action dated Aug. 8, 2023, issued in counterpart JP Application No. 2020-563212, with English Translation. (9 pages).

* cited by examiner

*Primary Examiner* — Benjamin J Packard
(74) *Attorney, Agent, or Firm* — WHDA, LLP

(57) ABSTRACT

The present invention addresses the problem of providing phosphine for fumigation, by which clogging of a pipe of a fumigation gas feed device due to impurities is effectively suppressed and which has low spontaneous ignitability. The present invention also addresses the problem of providing a phosphine fumigation method in which clogging of a pipe of a fumigation gas feed device and a possibility of spontaneous ignition are reduced and which is safe. The phosphine for fumigation of the present invention has a $P_4$ content of 10 mass ppm or less and a water content of 10 mass ppm or less. The fumigation method of the present invention includes fumigating a material to be fumigated, using phosphine having a $P_4$ content of 10 mass ppm or less and having a water content of 10 mass ppm or less.

4 Claims, No Drawings

US 12,022,834 B2

PHOSPHINE FOR FUMIGATION, METHOD FOR PRODUCING SAME, AND FUMIGATION METHOD

TECHNICAL FIELD

The present invention relates to phosphine for fumigation and a fumigation method using the same.

BACKGROUND ART

Phosphine is a compound represented by $PH_3$. Phosphine is excellent in insecticidal action and is used as a fumigant.

Phosphine is generally produced by a method of allowing yellow phosphorus (main component: $P_4$) and an alkali to act on each other, a method of hydrolyzing yellow phosphorus at a high temperature, a method of allowing water or an acid to react with a metallic phosphorus compound such as aluminum phosphide or zinc phosphide, a method of electrolytically reducing yellow phosphorus, a method of electrolytically reducing yellow phosphorus with zinc, cadmium or amalgam, a method including heating yellow phosphorus to prepare red phosphorus and bringing the red phosphorus into contact with water in phosphoric acid, or the like. However, phosphine before purification (also referred to as "crude phosphine" hereinafter), which is obtained by any of the above methods, is also known to have impurities.

For example, in Patent Literature 1, it is described that if a lower phosphorus hydride compound is contained in crude phosphine, a yellow tar-like or powdery substance is deposited on an inner wall of a valve or the like to cause clogging and operational hazards, which lead to danger, and that an activated carbon is used in order to remove the lower phosphorus hydride compound. In Patent Literature 2, it is described that in order to obtain high-purity phosphine for semiconductor production, water in phosphine is removed by zeolite.

CITATION LIST

Patent Literature

Patent Literature 1
Japanese Patent Laid-Open No. 58-49608
Patent Literature 2
Japanese Patent Laid-Open No. 62-138313

SUMMARY OF INVENTION

The phosphine from which a lower phosphorus hydride compound has been removed by an activated carbon as described in Patent Literature 1 has a problem that even in the case where this phosphine is used for fumigation, a solid is deposited inside a pipe of a fumigation gas feed device, and the solid deposition causes clogging or scaling in a pipe or a valve of the fumigation gas feed device. On the other hand, the high-purity phosphine described in Patent Literature 2 causes no clogging because it is highly pure, but the phosphine becomes expensive. Accordingly, phosphine having economic efficiency of such a degree that it can be used for fumigation is desired. Moreover, it is said that phosphine has spontaneous ignitability in itself or has spontaneous ignitability attributed to impurities. Accordingly, for the purpose of fumigation safety, phosphine having low spontaneous ignitability is desired.

The present invention addresses the problem of providing phosphine for fumigation by which clogging or scaling of a pipe or a valve due to impurities is effectively suppressed and which has low spontaneous ignitability.

In order to solve the above problem, the present inventor has earnestly studied, and as a result, has found that the above problem can be solved by setting both the amounts of $P_4$ and water to prescribed values or less, and has completed the present invention.

That is to say, the present invention provides phosphine for fumigation, having a $P_4$ content of 10 mass ppm or less and having a water content of 10 mass ppm or less.

The present invention also provides a fumigation method comprising fumigating a material to be fumigated, using phosphine having a $P_4$ content of 10 mass ppm or less and having a water content of 10 mass ppm or less.

DESCRIPTION OF EMBODIMENT

A preferred embodiment of the present invention will be described hereinafter. Phosphine used in the present invention is a compound represented by $PH_3$. A property of the phosphine may be any one of solid, liquid and gaseous. The phosphine is distributed and/or stored in a state of a liquid contained in, for example, a pressure vessel, and is used for fumigation in a state of a gas.

The present inventor has earnestly studied the cause that conventional phosphine for fumigation clogs a pipe of a fumigation gas feed device. As a result, he has found that presence or absence of clogging of a pipe has a relation to an amount of $P_4$ in phosphine. Although the reason for this is not clear, it is assumed that the deposit inside the pipe is $P_4$ or a solid hydrogen phosphide component similar in behavior to $P_4$ contained in phosphine as an impurity, and if the solid hydrogen phosphide is decomposed, it also becomes $P_4$. The present inventor has thought that by reducing the amount of $P_4$ as an indication of impurities in the phosphine, clogging of a pipe can be prevented. Moreover, the present inventor has found that by reducing the amount of water together with the amount of $P_4$, spontaneous ignitability can be decreased, as described later.

The present inventor has assumed that $P_4$ exists as a solid in liquid phosphine and exists as vapor or mist in gas phosphine. It is assumed that $P_4$ is derived from a raw material for the phosphine production and is mixed in phosphine. The present inventor has thought that $P_4$ can be formed also by further decomposition of the aforesaid solid hydrogen phosphide, as previously described.

From the viewpoints of suppression of pipe clogging and suppression of spontaneous ignition, the content of $P_4$ in the phosphine is 10 mass ppm or less, preferably 5 mass ppm or less. Preferably, $P_4$ is not substantially contained in the phosphine, but from the viewpoint of production cost of the phosphine for fumigation, the content of $P_4$ is preferably 0.1 mass ppm or more. Here, the content of $P_4$ is a ratio of $P_4$ to the phosphine ($PH_3$).

The present inventor has found that in addition to the reduction of the amount of $P_4$ in the phosphine, reduction of the amount of water in the phosphine is also important in order to suppress clogging of a pipe caused by the phosphine and suppress spontaneous ignition of the phosphine. The reason for this is not clear, but when phosphine comes into contact with water, it sometimes reacts with water and changes into $P_4$ or solid hydrogen phosphide having behavior similar to that of $P_4$. Accordingly, by setting the amount of water in the phosphine to a prescribed value or less, occurrence of such reaction can be prevented. The present inventor has thought that attributably to this, occurrence of clogging of a pipe due to deposition of a solid can be effectively suppressed, and spontaneous ignitability can be decreased.

From the viewpoints of suppression of clogging of a pipe or a valve and suppression of spontaneous ignition the amount of water in the phosphine is 10 mass ppm or less, preferably 5 mass ppm or less. The amount of water in the phosphine is preferably smaller, but from the viewpoint of production cost of the phosphine, the amount of water is preferably 0.1 mass ppm or more. Here, the amount of water is a ratio of water to the phosphine ($PH_3$).

In order to set the $P_4$ content and the water content in the phosphine for fumigation to the aforesaid upper limits or less, for example, crude phosphine is subjected to a specific purification method described later. For producing crude phosphine that becomes a raw material of the phosphine for fumigation, any of a method of allowing yellow phosphorus and an alkali to act on each other, a method of hydrolyzing yellow phosphorus at a high temperature, a method of allowing water or an acid to react with a metallic phosphorus compound such as aluminum phosphide or zinc phosphide, a method of eiectrolytically reducing yellow phosphorus, a method of electrolytically reducing yellow phosphorus with zinc, cadmium or amalgam, a method including heating yellow phosphorus to prepare red phosphorus and bringing the red phosphorus into contact with water in phosphoric acid, and the like may be used.

Preferably, yellow phosphorus and an alkali are allowed to act on each other to produce phosphine.

The method of allowing yellow phosphorus and an alkali to act on each other may be any of the following (1) and (2).

$$P_4+3NaOH+3H_2O \rightarrow 3PH_3+3NaH_2PO_2 \quad (1)$$

$$P_4+4H_2O+2NaOH \rightarrow 2PH_3+2HaH_2PO_3 \quad (2)$$

Conventional phosphine for fumigation is produced by bringing water into contact with aluminum phosphide or zinc phosphide, and is used for fumigation as it is. Alternatively, crude phosphine produced by the aforesaid each method is simply purified with an activated carbon, zeolite or the like, and is used. The amount of water and the amount of $P_4$ in such conventional phosphine for fumigation were larger than the aforesaid upper limits.

In order to set the $P_4$ content and the water content in the phosphine used in the present invention to the aforesaid upper limits or less, for example, a method of adsorption removing $P_4$ from crude phosphine obtained by the aforesaid each method, using zeolite, an activated carbon or the like, a method of dehydrating phosphine by cooling below the freezing point, a method of dehydrating phosphine using silica gel, zeolite or the like, and combinations of these methods can be used. The above methods may be combined with a method of washing crude phosphine obtained by the aforesaid each method, with water. After the method of washing with water, drying needs to be carried out, but except for this point, the order of these methods is not particularly limited.

As previously described, when phosphine comes into contact with water, it may react with water and change into $P_4$ or solid hydrogen phosphide having behavior similar to that of $P_4$. Thus, if water in phosphine can be removed first, it is possible to suppress by-product formation of $P_4$ or solid hydrogen phosphide. However, the aforesaid zeolite or silica gel used for dehydrating phosphine has pores that function to remove water, and owing to the presence of $P_4$ or solid hydrogen phosphide in phosphine, the pores are closed, and therefore, sufficient dehydration effects may be difficult to obtain. Moreover, accumulation of $P_4$ or solid hydrogen phosphide may lead to easy ignition. From such viewpoints, it is particularly preferable to carry out rapid adsorption removal of $P_4$ in phosphine and dehydration of phosphine in this order because a life of silica gel or zeolite used for dehydration can be extended, and the safety of the step is enhanced.

The zeolite is not particularly limited and may be any of natural and synthetic ones, and examples of the natural zeolites include analcime ($SiO_2/Al_2O_3$=3.6 to 5.6), ehabazite ($SiO_2/Al_2O_3$=3.2 to 6.0), clinoptilolite ($SiO_2/Al_2O_3$=8.5 to 10.5), erionite ($SiO_2/Al_2O_3$=5.8 to 7.4), faujasite ($SiO_2/Al_2O_3$=4.2 to 4.6), mordenite ($SiO_2/Al_2O_3$=0.34 to 10.0), and phillipsite ($SiO_2/Al_2O_3$=2.6 to 4.4). Examples of the synthetic zeolites include A type zeolite ($SiO_2/Al_2O_3$=1.4 to 2.4), X type zeolite ($SiO_2/Al_2O_3$=2 to 3), and Y type zeolite ($SiO_2/Al_2O_3$=3 to 6). Regarding the particle diameter, the specific surface area is preferably 150 m$^2$/g or more, and the average particle diameter is preferably 0.1 to 100 μm, more preferably 0.1 to 50 μm.

Examples of the activated carbons include, but not limited to, activated carbons derived from minerals such as coal, petroleum pitch and tar, activated carbons derived from plants such as coconut shell, wood and bamboo, activated carbons using resins such as phenolic resin, melaraine resin, polyimide resin and polyester resin, as raw materials, and activated carbons composed of molecular sieve carbons. Examples of shapes of the activated carbons include powdery activated carbon, particulate activated carbon, crushed activated carbon and fibrous activated carbon. The specific surface area of the activated carbon is preferably 150 m$^2$/g or more, more preferably 300 m$^2$/g or more.

The silica gel only needs to be amorphous silica other than silica sol, and examples thereof include silica gel that meets the standards of JIS Z0701, finely powdered silicic acid obtained by wet process, such as white carbon, finely powdered silicic acid obtained by dry process, such as Aerosil, dust that is a by-product from a production process for silicon or ferrosilicon, and ganister naturally produced. Regarding the particle diameter, the specific surface area is preferably 150 m$^2$/g or more, and the average particle diameter is preferably 0.1 to 100 μm, more preferably 0.1 to 50 μm.

In the phosphine used in the present invention, the amount of diphosphine that is a kind of impurity is preferably a prescribed amount or less. Diphosphine is a compound represented by $H_4P_2$. When diphosphine is decomposed, solid phosphorus hydride showing behavior resembling that of $P_4$ is sometimes formed. From this, the amount of diphosphine in the phosphine used in the present invention is preferably 100 mass ppm or less, more preferably 70 mass ppm or less, still more preferably 50 mass ppm or less, much more preferably 30 mass ppm or less. From the viewpoint of ease of production of the phosphine, the amount of diphosphine is preferably 1 mass ppm or more. The amount of diphosphine is a ratio of diphosphine to the phosphine ($PH_3$).

For setting the amount of diphosphine to the aforesaid upper limit or less, for example, the same method as the purification method previously described in order to set the amount of water and the amount of $P_4$ to the aforesaid upper limits or less only needs to be adopted.

In the present invention, the amount of water, the amount of $P_4$ and the amount of diphosphine are all measured in phosphine in a gas state. The amount of water in the phosphine is measured by Karl Fischer method. The amount of $P_4$ is measured by a phosphovanadomolybdic acid colorimetric method. The amount of diphosphine is measured by a nuclear magnetic resonance method.

In the phosphine used in the present invention, the amounts of impurities other than the aforesaid water, $P_4$ and diphosphine are also preferably as small as possible. Specifically, in the phosphine, the amount of $H_2$ is preferably 100 mass ppm or more and 10000 mass ppm or less, more preferably 200 mass ppm or more and 9000 mass ppm or less.

The amount of $N_2$ is preferably 1 mass ppm or more and 500 mass ppm or less, more preferably 10 mass ppm or more and 300 mass ppm or less.

The amount of $O_2$ is preferably 0.1 mass ppm or more and 50 mass ppm or less, more preferably 0.5 mass ppm or more and 30 mass ppm or less.

The amount of $AsH_3$ is preferably 1 mass ppm or more and 500 mass ppm or less, more preferably 10 mass ppm or more and 300 mass ppm or less.

The amount of $CO_2$ is preferably 0.01 mass ppm or more and 1 mass ppm or less, more preferably 0.05 mass ppm or more and 0.5 mass ppm or less.

The phosphine for fumigation containing impurities in the above ranges is preferable because a balance between production cost or ease of production and safety can be achieved. The amounts of these impurities are amounts based on the phosphine, and can be measured by, for example, gas chromatography or atomic-adsorption spectroscopy.

The purity of the phosphine used in the present invention is preferably 98 mass % or more, more preferably 99 mass % more. The purity of the phosphine is preferably 99.9 mass % or less from the viewpoint of ease of production of the phosphine.

Since the phosphine used in the present invention contains the aforesaid small amount of water and small amount of $P_4$, it has low spontaneous ignitability and has better handieability than conventional one. For example, it is preferable that when the phosphine used in the present invention has a concentration of more than 1 vol %, preferably 1.3 vol % or more, in air at 54° C. or lower, the phosphine should not spontaneously ignite. The expression that when the phosphine has a concentration of more than 1 vol % and 1.3 vol % or more, it does not spontaneously ignite means that the phosphine does not spontaneously ignite at any one of a concentration of more than 1 vol % and a concentration of 1.3 vol % or more, and the phosphine is not required not to spontaneously ignite at any concentration of more than 1 vol % and 1.3 vol % or more. Specifically, when the spontaneous ignition temperature of the phosphine is measured at atmospheric pressure on the basis of the standards of IEC 60079-20-1:2010, the spontaneous ignition temperature is preferably higher than 54° C. For specifically measuring the spontaneous ignition temperature, a method described later can be used.

In the present invention, the phosphine is stored/distributed as a liquid in a pressure vessel such as a cylinder or a storage tank, then vaporized at ordinary temperature and normal pressure, and is used for fumigation as it is or after mixed with an inert gas. Examples of the inert gases include carbon dioxide and nitrogen. The mixing ratio between the phosphine and the inert gas is preferably phosphine:inert gas=1:0.1 to 100, more preferably 1:0.5 to 90, in terms of a volume ratio.

In the present invention, fumigation refers to bringing a gas having an exterminating effect on various harmful organisms such as mold, bacteria and insects into contact with an object (also referred to as a "material to be fumigated" hereinafter) for the purpose of exterminating these harmful organisms. Examples of the materials to be fumigated include cultivated plants, food other than cultivated plants, soil, buildings and cultural properties. The cultivated plants may be those before harvest or may be those after harvest.

EXAMPLES

The present invention will be described in more detail with reference to the following examples, but the present invention is in no way limited to those examples.

Example 1

To 30 g of yellow phosphorus, 102.4 g of a sodium hydroxide aqueous solution of 25 mass % was added, and they were allowed to react with each other by a conventional method to generate 0.5 L of a mixed gas having a volume ratio of phosphine:hydrogen=1:1. This generated gas was immersed in liquid nitrogen at −200° C. and introduced into a pressurized vessel having been cooled, thereby condensing phosphine, and a part of water was removed. Thereafter, the pressurized vessel was taken out of the liquid nitrogen and gradually heated to room temperature to release uncondensed hydrogen, thereby obtaining crude phosphine.

The resulting crude phosphine was passed through a column having an inner diameter of 40 mm and a length of 400 mm and packed with 300 ml of an activated carbon (manufactured by Osaka Gas Chemicals Co., Ltd., Granular SHIRASAGI G2c) at a flow rate of 1 L/min, then passed through a cooling tower to cool the phosphine to 10° C., and thereafter passed through a column having an inner diameter of 40 mm and a length of 400 mm and packed with 300 ml of A-type silica gel (JIS Z0701) at a flow rate of 1 L/min, thereby obtaining purified phosphine. The amount of water, the amount of $P_4$ and the amount of diphosphine in the resulting purified phosphine are set forth in Table 1. Regarding impurities other than water, $P_4$ and diphosphine in the resulting purified phosphine, the amount of $H_2$ was 3000 mass ppm, the amount of was 41.2 mass ppm, the amount of $O_2$ was 0.94 mass ppm, the amount of $AsH_3$ was 100 mass ppm, and the amount of $CO_2$ was 0.1 mass ppm.

Example 2

Purified phosphine was obtained in the same manner as in Example 1, except for passing through A-type zeolite (manufactured by Wako Pure Chemical Industries, Ltd., Molecular Sieves 3A) instead of the A-type silica gel. The amount of water, the amount of $P_4$ and the amount of diphosphine in the resulting purified phosphine are set forth in Table 1. Regarding impurities other than water, $P_4$ and diphosphine in the resulting purified phosphine, the amount of $H_2$ was 2950 mass ppm, the amount of $N_2$ was 41.8 mass ppm, the amount of $O_2$ was 0.95 mass ppm, the amount of $AsH_3$ was 99 mass ppm, and the amount of $CO_2$ was 0.1 mass ppm.

Example 3

Purified phosphine was obtained in the same manner as in Example 1, except that crude phosphine obtained in the same manner as in Example 1 was passed through an activated carbon and A-type silica gel at a flow rate of 3 L/min. The amount of water, the amount of $P_4$ and the amount of diphosphine in the resulting purified phosphine are set forth in Table 1. Regarding impurities other than water, $P_4$ and diphosphine in the resulting purified phosphine, the amount of $H_2$ was 3100 mass ppm, the amount of $N_2$ was 42.2 mass ppm, the amount of $O_2$ was 0.1 mass ppm, the amount of $AsH_3$ was 105 mass ppm, and the amount of $CO_2$ was 0.1 mass ppm.

Comparative Example 1

The crude phosphine obtained in Example 1 was regarded as Comparative Example 1. The amount of water, the amount of $P_4$ and the amount of diphosphine in the resulting crude phosphine are set forth in Table 1.

Comparative Example 2

Purified phosphine was obtained in the same manner as in Example 1, except that crude phosphine obtained in the same manner as in Example 1 was passed through an activated carbon and A-type silica gel at a flow rate of 10 L/min. The amount of water, the amount of $P_4$ and the amount of diphosphine in the resulting purified phosphine are set forth in Table 1. Regarding impurities other than water, $P_4$ and diphosphine in the resulting purified phosphine, the amount of $H_2$ was 3200 mass ppm, the amount of $N_2$ was 62.2 mass ppm, the amount of $O_2$ was 2 mass ppm, the amount of $AsH_3$ was 200 mass ppm, and the amount of $CO_2$ was 0.2 mass ppm.

Example 4

To 300 g of aluminum phosphide, 1 liter of water having been heated to 40° C. was gradually added, and they were allowed to react with each other by a conventional method to generate 30 L of a gas. The gas generated was introduced into a pressurized vessel cooled by immersion in liquid nitrogen at −200° C., thereby condensing phcsphine, and a part of water was removed. Thereafter, the pressurized vessel was taken out of the liquid nitrogen and gradually heated to room temperature, thereby obtaining crude phosphine.

The resulting crude phosphine was purified in the same manner as in Example 1, thereby obtaining purified phosphine. The amount of water, the amount of $P_4$ and the amount of diphosphine in the resulting purified phosphine are set forth in Table 1. Regarding impurities other than water, $P_4$ and diphosphine in the resulting purified phosphine, the amount of $H_2$ was 3100 mass ppm, the amount of $N_2$ was 42.2 mass ppm, the amount of $O_2$ was 1 mass ppm, the amount of $AsH_3$ was 100 mass ppm, and the amount of $CO_2$ was 0.1 mass ppm.

Comparative Example 3

The crude phosphine obtained in Example 4 was regarded as Comparative Example 3. The amount of water, the amount of $P_4$ and the amount of diphosphine in the resulting crude phosphine are set forth in Table 1.

TABLE 1

| | Phosphine (mass %) | Water* (mass ppm) | $P_4$** (mass ppm) | Diphosphine*** (mass ppm) |
|---|---|---|---|---|
| Ex. 1 | 99.7 | Not detected | Not detected | 20 |
| Ex. 2 | 99.7 | Not detected | Not detected | 22 |
| Ex. 3 | 99.4 | 3 | 1 | 28 |
| Comp. Ex. 1 | 98.5 | 500 | 1,000 | 10,000 |
| Comp. Ex. 2 | 99.0 | 20 | 30 | 300 |
| Ex. 4 | 99.6 | Not detected | Not detected | Not detected |
| Comp. Ex. 3 | 97.3 | 800 | 770 | Not detected |

*Detection limit: 1 mass ppm
**Detection limit: 1 mass ppm
***Detection limit: 10 mass ppm Method for Measuring Amount of Water in Phosphine Gas Using 875 KF Gas Analyzer (manufactured by Metrohm AG), the amount of water was measured by Karl Fischer method. The measuring temperature was set to 25° C.

Method for Measuring Amount of $P_4$ in Phosphine Gas

Using a solution obtained by passing phosphine gas through cooled benzene to allow the benzene to absorb $P_4$ and removing phosphine by degassing, measurement was carried out by a phosphovanadomolybdic acid colorimetric method. The measuring temperature was set to 25° C.

Method for Measuring Amount of Diphosphine

Using a solution obtained by allowing an acetone-dry ice solution to absorb phosphine gas, measurement was carried out by the use of a nuclear magnetic resonance (NMR) device (manufactured by JEOL Ltd., JNM-ECA500).

Method for Measuring $AsH_3$ in Phosphine Gas

As an atomic-adsorption spectroscopic device, VARIAN-AA240 (manufactured by Agilent Technologies, Inc.) was used. As a standard solution used for a calibration curve, a standard solution for arsenic standard solution atomic absorption (manufactured by Wake Pure Chemical Industries, Ltd., 1000 ppm) was used. 50 ml of a 1N potassium permanganate was allowed to completely absorb 100 ml of the phosphine gas as a sample, and the amount of arsenic in this absorbing solution was analyzed by an atomic absorption absolute calibration curve method. From the amount of arsenic measured, the number of moles of $AsH_3$ was calculated, and a mass concentration in terms of arsine in the phosphine was calculated.

Method for Measuring Purity of Phosphine, and $H_2$, $N_2$, $O_2$ and $CO_2$

Measurement was carried out by gas chromatography (manufactured by Shimadzu Corporation, GC-7A) analysis under the following conditions. The purity of the phosphine was a numerical value obtained by subtracting the amount of water and the amounts of $P_4$, diphosphine and $AsH_3$ in the phosphine, and analytical values of gas components other than phosphine detected by gas chromatography analysis. In the examples and the comparative examples, $H_2$, $N_2$, $O_2$ and $CO_2$ were detected as gases other than phosphine.

Measurement Conditions of Gas Chromatography

A measurement sample was dispensed into a container with a septum cap in an inert gas atmosphere, and 0.2 μL of the measurement sample was injected into gas chromatography (manufactured by Shiraadzu Corporation, "GC-7A" by a syringe, and measurement was carried out under the following conditions.

Column: Porapak T, 50-80 mesh (GL Sciences Inc.)
Column temperature: 60° C.
Detector: TCD, Carrier gas: He (100 kPa pressure)

The amounts of the impurity gas components were determined by an area normalization method in which the total area of peaks detected was taken as 100%, and a ratio of an area of a peak to the peak total area was calculated.

Evaluation (1) Foreign Matter Deposition

The phosphine gases obtained in the examples and the comparative examples were each pressurized to prepare liquefied phosphine, and a 47 L high pressure gas cylinder was filled with the liquefied phosphine. From this cylinder, the phosphine gas was passed through a stainless-steel BA pipe (SUS304 TP-SC-BA JIS G3459) having an inner diameter of 3.18 mm and a length of 2 m at a rate of 20 L/min. After a lapse of 9 hours, presence or absence of powder deposition inside the pipe was visually confirmed, and evaluation was carried out based on the following evaluation criteria. The results are set forth in Table 2.

−: Any powder was not detected inside the pipe at all.
+: A powder was deposited inside the pipe, and scaling was detected on the pipe inner wall.

TABLE 2

|  | Presence or absence of deposit |
| --- | --- |
| Ex. 1 | − |
| Ex. 2 | − |
| Ex. 3 | − |
| Comp. Ex. 1 | + |
| Comp. Ex. 2 | + |
| Ex. 4 | − |
| Comp. Ex. 3 | + |

(2) Spontaneous Ignitability

A spontaneous ignition temperature was measured as in the standards of IEC 60079-20-1:2010. In accordance with the standards, the measurement of the spontaneous ignition temperature was carried out by injecting a gas sample into a 200 ml Erlenmeyer flask which had been heated to a prescribed temperature, which was in an open state and which was filled with air, and then confirming whether spontaneous ignition took place or not. Into the Erlenmeyer flask, 20 ml of the gas sample (phosphine) was injected at a rate of 25 ml per second by a 200 ml airtight syringe. A case where ignition took place within 5 minutes after completion of injection was observed as spontaneously ignitable. The spontaneous ignition temperature was measured every 1° C. from 20° C.

As the flask used in the test and the furnace to heat the flask, those described in FIG. A.1 in "IEC 6079-20-1:2000" were used. As a material of the flask, borosilicate glass was used.

As the device to inject the gas sample, that described in FIG. A.9 in "IEC 60079-20-1:2000" was used.

The results are set forth in Table 3.

TABLE 3

|  | Spontaneous ignition temperature |
| --- | --- |
| Ex. 1 | No ignition even at higher than 100° C. |
| Ex. 2 | No ignition even at higher than 100° C. |
| Ex. 3 | No ignition even at higher than 100° C. |
| Comp. Ex. 1 | 38° C. |
| Comp. Ex. 2 | 38° C. |
| Ex. 4 | No ignition even at higher than 100° C. |
| Comp. Ex. 3 | 38° C. |

INDUSTRIAL APPLICABILITY

By the phosphine for fumigation of the present invention, clogging of a pipe or a valve of a fumigation gas feed device due to impurities is effectively suppressed, and the phosphine has low spontaneous ignitability. In the fumigation method of the present invention, dogging of a pipe of a fumigation gas feed device is prevented and a possibility of spontaneous ignition is reduced, and the method is safe.

The invention claimed is:

1. Phosphine for fumigation, having a $P_4$ content of 10 mass ppm or less and having a water content of 10 mass ppm or less,
wherein the phosphine is produced by a method for producing phosphine for fumigation, the method comprising a purification step of removing $P_4$ in phosphine by an activated carbon and then removing water by silica gel or zeolite.

2. The phosphine for fumigation according to claim 1, having a diphosphine content of 100 mass ppm or less.

3. The phosphine for fumigation according to claim 1, wherein when the phosphine has a concentration of more than 1 vol % in air at 54° C. or lower, the phosphine does not spontaneously ignite.

4. A method for producing phosphine for fumigation having a $P_4$ content of 10 mass ppm or less and having a water content of 10 mass ppm or less, the method comprising a purification step of removing $P_4$ in phosphine by an activated carbon and then removing water by silica gel or zeolite.

* * * * *